T. W. H. MOSELEY.
METAL SCREW PILES.
No. 108,814. Patented Nov. 1, 1870.
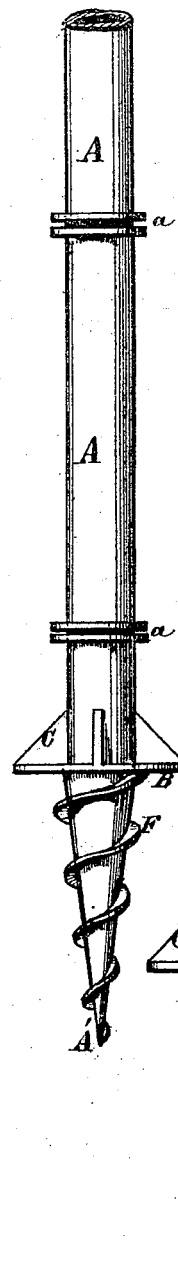
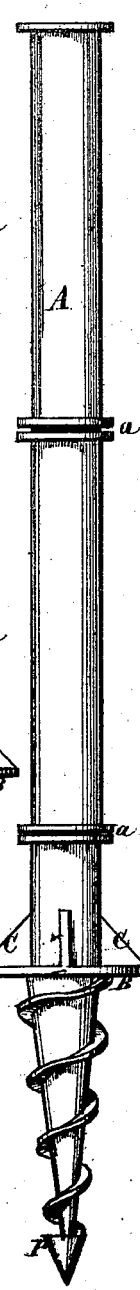
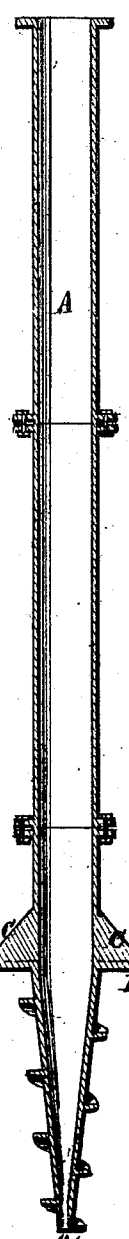
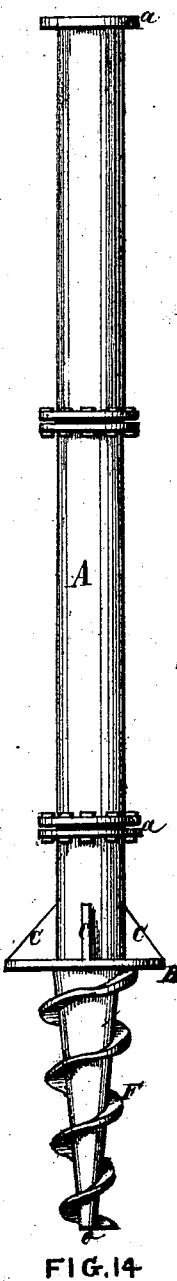
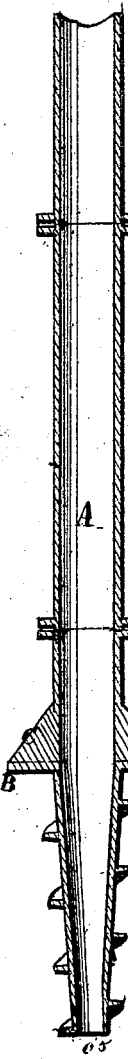
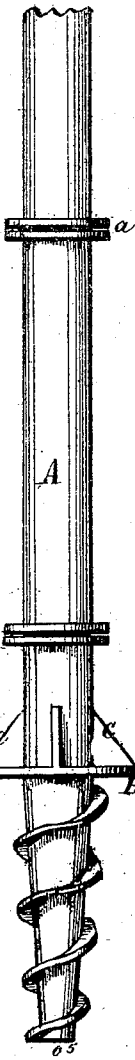
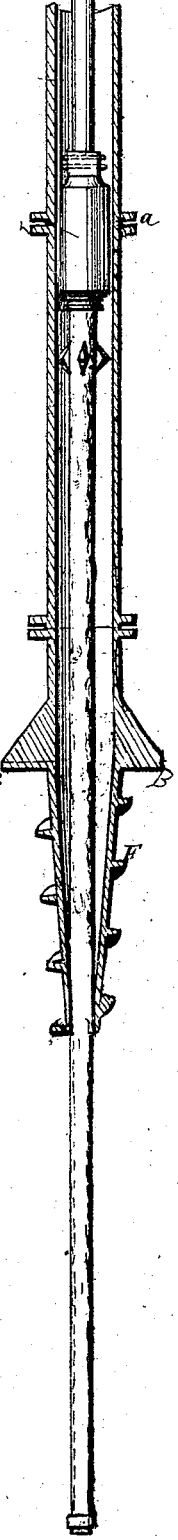
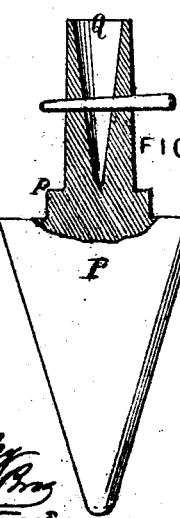
FIG. 1. FIG. 2. FIG. 3. FIG. 4. FIG. 5. FIG. 6. FIG. 7. FIG. 13. FIG. 14.
WITNESSES

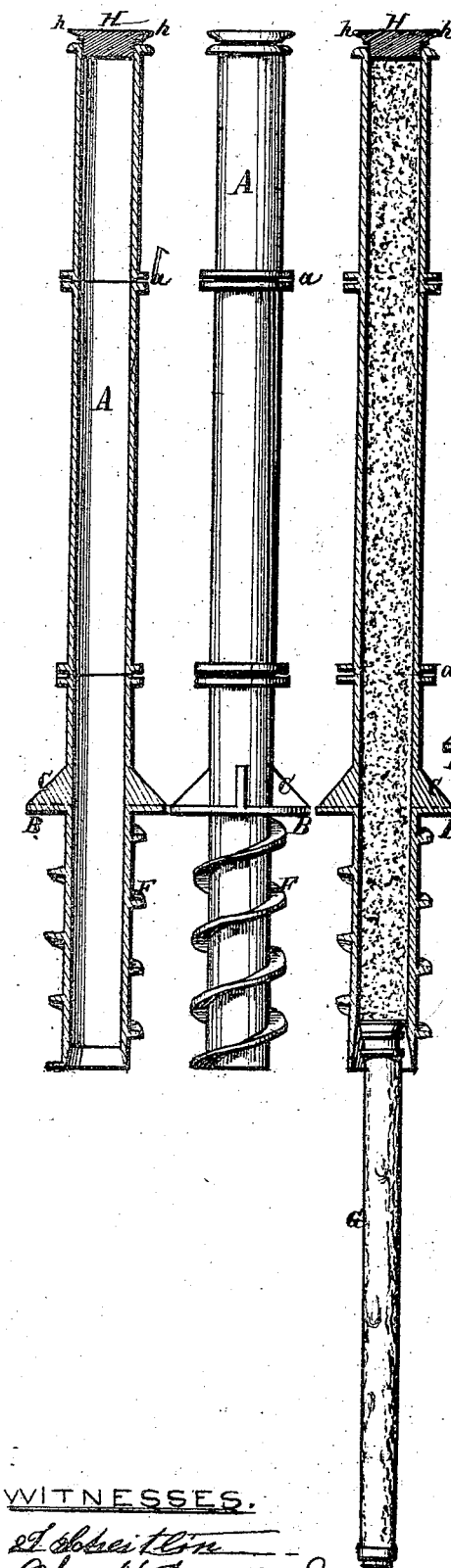
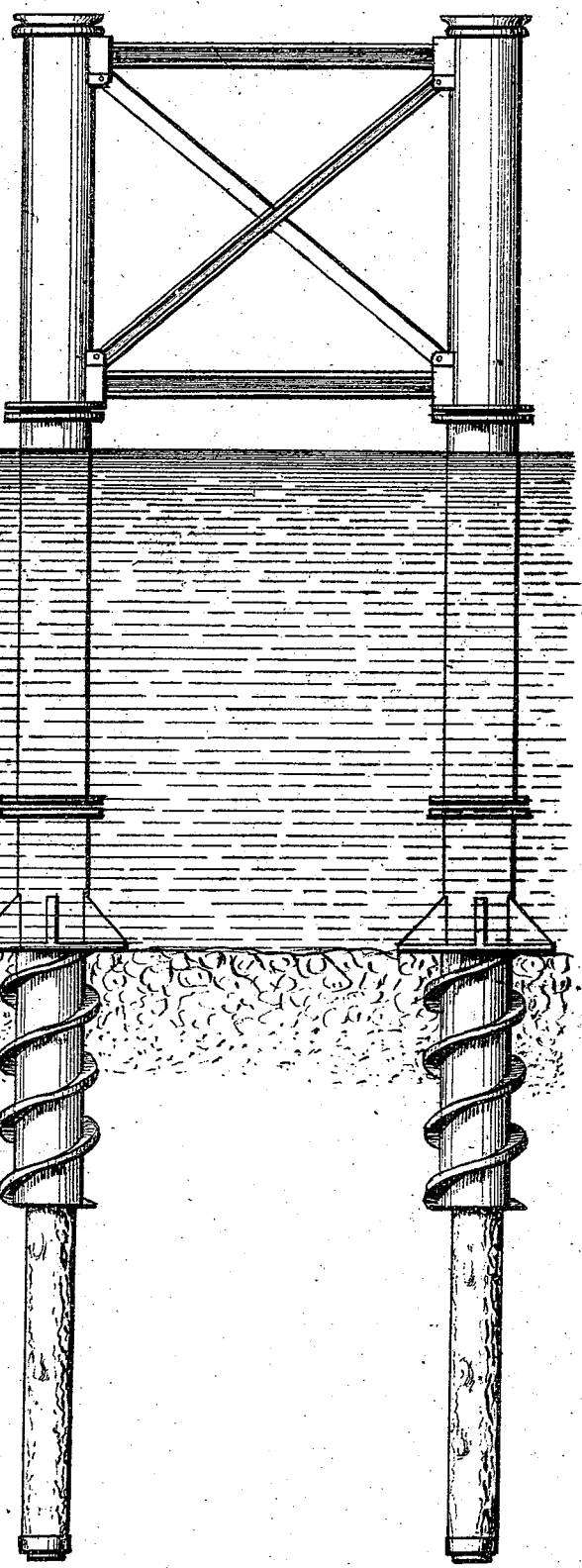

United States Patent Office.

THOMAS W. H. MOSELEY, OF BOSTON, MASSACHUSETTS.

Letters Patent No. 108,814, dated November 1, 1870.

IMPROVEMENT IN PILES FOR ENGINEERING PURPOSES.

The Schedule referred to in these Letters Patent and making part of the same.

I, THOMAS W. H. MOSELEY, of Boston, in the State of Massachusetts, have invented certain new and useful Improvements in Piles for Engineering Purposes, of which the following is a specification.

Nature and Objects of the Invention.

The first part of my invention consists in the combination of a hollow screw-pile, a sub-pile, adapted to be passed down through the said hollow pile, and a concrete filling to receive the upward pressure of the sub-pile, as hereinafter described.

The second part of my invention consists in combining a hollow screw-pile, a sub-pile, passed downward through the hollow pile, and a concrete filling, resting on the top of the sub-pile, occupying the entire bore of the hollow pile, and sustaining any upward pressure of the former within the latter.

The third part of my invention consists in a movable point of peculiar construction, adapted to remove obstructions by a rotary movement, as hereinafter explained.

Description of the Accompanying Drawing.

Figure 1 shows in elevation a hollow pile with solid conical point, surrounded by a screw-flange.

Figure 2 is an elevation of a hollow metallic pile with a hollow screw-point and a removable point or "pilot" applied to its extremity.

Figure 3 represents a longitudinal section of a similar pile, without the pilot.

Figure 4 is an elevation of the same.

Figure 5 represents a longitudinal section of a pile with a larger aperture at its extremity to adapt it for a different character of soil.

Figure 6 is an elevation of the same.

Figure 7 represents a longitudinal section thereof, showing in elevation a wooden pile passed through the hollow metallic pile.

Figure 8 represents a longitudinal section of a pile constructed without taper at its end.

Figure 9 is an elevation of the same.

Figure 10 represents a longitudinal section of a similar pile with a wooden pile projected through its lower end, and the hollow metallic shell filled with concrete.

Figure 11 is an elevation of a pile similar to that represented in figs. 8, 9, and 10, but with the flukes or screw-flanges omitted at the extreme end, so that the cylindrical end will constitute a guide below the flukes.

Figure 12 represents, in elevation, a set of piles in position, framed together and constituting the side of a pier.

Figure 13 is an elevation, on a larger scale, of the pilot or removable point, the shank thereof being shown in section.

Figure 14 is a top-view of the same.

In all the figures like letters of reference indicate corresponding parts.

General Description.

My invention is applied or embodied under four or more modifications, all involving the same principles but varying to suit the character or condition of the ground in which they are to be used.

All are generally of cast-iron and hollow, varying in caliber from eight inches to six or more feet, and in thickness of shell from one-half inch to two inches or more. They are usually made in sections A A A, from twelve to sixteen feet in length, with flanges, $a$ $a$, at the ends for the purpose of uniting two or more sections, as the depth may render necessary.

Near the point or lower end of the first section are flukes or screw-flanges, F F, varying in width from three inches to two feet, and in pitch as the nature of the ground may require. The spiral flukes or screw-flanges usually extend for a distance of eight feet from the lower end of the pile, though in some cases much longer and in other cases shorter screws may be used.

A base, B, extends around the pile above the screw-flanges, having a horizontal width equal to about the diameter of the pile. This base, and its strengthening braces or brackets C C, to resist the downward pressure, are cast in one piece with the pile.

For hard, compact ground, which will afford at once a good hold for the screw-flanges and an adequate support for the iron pile and its burden without the use of a supplemental or sub-pile hereinafter described, I employ a solid gimlet-point, A', fig. 1, with the screw-flanges F cast upon it.

In the other forms of the pile the hollow extends from end to end.

The pile shown in figs 2, 3, and 4 is used in clay, &c., which is compact and tough, but not so hard as that for which the pile shown in fig. 1 is required. It differs but slightly in external form from that shown in fig. 1, but is made hollow throughout with a small orifice, $o$, at its lower end. The tough clay and soil passing through this orifice as the pile is turned give space for the point to descend and allow the flukes or flanges F to take hold of the walls of the clay.

Where the ground contains many obstructions of such a character as to tend to deflect the screw from its proper course and interfere with the action of the flukes F, I apply a separate spear-shaped point, P.

called a pilot, and represented on a larger scale in figs. 13 and 14.

This pilot is constructed with lugs, $p\ p$, through which it receives the rotary motion imparted to the pile to screw it into the earth, and with a hollow shank, Q, about twelve inches long, which fits within the orifice $o$, and which receives within it a center-pin or shaft, which I employ for finding the exact position that the pile is to occupy beneath the water.

In practice, the pilot P is passed down first separately from the pile, on the point of the center-pin to its correct position in the clay and there deposited. The pile is then sent down by the aid of, and over the center-pin, until the orifice $o$ in its lower end passes over the handle or shank Q of the pilot, and the lugs $p\ p$ fitting in notches or recesses prepared for them in the end of the pile, form a clutch by which the pilot is turned when the pile revolves. This pilot is used in soil that has small stones, leaves, sticks, shells, and other obstructions, which would otherwise foul the orifice of the pile and interfere with its passage downward.

For clay, gravel, or other soil not compact enough to require the pointed end shown in figs. 1, 2, or 3, and which is to carry a lighter burden, yet requiring a sure foundation, I form the end, and the orifice $o^5$ therein, about half the main diameter and caliber of the pile, as shown in figs. 5, 6, and 7.

After this pile is screwed or driven home the soil is taken out of the inside to near its lower end, and a wooden pile, G, fig. 7, of sufficient length, sent down through it to a solid bottom, either stone or hard pan.

Figs. 8, 9, and 10 represent a form of pile similar to that last described, except that it has no taper at its screw-end, but is uniform in internal and external diameter.

This pile is used in softer clay than either of the others and where heavier burdens are to be borne, and the hard bottom is at a greater depth thus necessitating a larger and longer wooden pile, G.

The wooden pile, in either case, is well banded with iron at both its lower and upper ends, and when it is of smaller diameter than the interior of the pile A its upper end should be guided as shown at fig. 7. And when it is driven to its proper position a cast-iron plate is placed upon its head inside of the hollow pile, and upon this head is deposited cement with clean sand or concrete, which in time becomes as hard and compact as stone.

The pile is filled within some three or four inches of its top, and a cast-head, H, with a coping-flange, $h$, is set on to the concrete, and a gum gasket on top of the cast pile beneath the coping-flange $h$. Upon this cast-head the burden or weight rests, thus dividing the pressure between the shell of the pile and the concrete filling, and down onto the wooden pile, which rests at its lower end upon a solid foundation.

The pile represented in fig. 11 is similar in form and dimensions throughout to that shown in figs. 8, 9, and 10, but its flukes or screw-flanges E do not go down to the bottom of the pile. The object in this is that in a loose shifting soil, such as mud or sand, the pile may have a guide below the flukes or screw-flanges. By first removing the soil from inside of this pile to its lower end the pile is allowed to sink down into the cavity thus made, the walls of which, surrounding the pile, prevent the foot of the latter moving one way or the other out of its proper position.

The piles are all set in their exact places and driven down by machinery of my own peculiar construction for this purpose alone.

The cement-filling answers several valuable purposes—

First, it is the body on which the burden may mostly rest;

Second, it gives weight and strength to the metal pile; and

Third, it preserves the metal from corrosion or oxidization.

Fig. 12 shows a set of piles representing a pier in the stream, driven home with their adjuncts, the wooden piles sent to foundation, and braced, and capped ready for use.

I do not claim the cap H as any part of the invention covered by this application, because it is described and claimed in an application previously filed by me.

Claims.

I claim as my invention—

1. The hollow metallic pile, provided with spiral flukes or flanges for carrying it into the soil, in combination with an interior sub-pile passed downward through the hollow screw-pile, and with a concrete filling, substantially as set forth.

2. The combination of the hollow screw-pile A, the sub-pile G, and the concrete-filling S, when arranged as herein represented and described, so that the concrete S will fill the bore of the hollow pile, rest on the top of the sub-pile, and sustain the pressure thereof.

3. The pilot P, having a socket, Q, for the reception of a center-pin, and lugs by which it is turned by the screw-pile when the latter reaches it, substantially as described.

THOS. W. H. MOSELEY.

Witnesses:
HARRIS WILSON,
J. S. McCLURE.